US005152135A

United States Patent [19]

Kare

[11] Patent Number: 5,152,135

[45] Date of Patent: Oct. 6, 1992

[54] REFLECTOR FOR EFFICIENT COUPLING OF A LASER BEAM TO AIR OR OTHER FLUIDS

[75] Inventor: Jordin T. Kare, Pleasanton, Calif.

[73] Assignee: The United States of America as represented by the United States Department of Energy, Washington, D.C.

[21] Appl. No.: 554,728

[22] Filed: Jul. 18, 1990

[51] Int. Cl.[5] .......... F02K 11/00

[52] U.S. Cl. .......... 60/203.1

[58] Field of Search .......... 60/203.1, 204, 200.1; 219/121.74, 121.76, 121.77

[56] References Cited

U.S. PATENT DOCUMENTS

| | | | |
|---|---|---|---|
| 3,818,700 | 6/1974 | Kantrowitz | 60/203.1 |
| 3,825,211 | 7/1974 | Minovitch | 60/203.1 |
| 4,036,012 | 7/1977 | Monsler | 60/203.1 |
| 4,426,843 | 1/1984 | Fowler et al. | 60/203.1 |

*Primary Examiner*—Louis J. Casaregola
*Attorney, Agent, or Firm*—Miguel A. Valdes; Henry P. Sartorio; William R. Moser

[57] ABSTRACT

A reflector array is disclosed herein that provides a controlled region or regions of plasma breakdowns from a laser beam produced at a remotely-based laser source. The plasma may be applied to produce thrust to propel a spacecraft, or to diagnose a laser beam, or to produce shockwaves. The spacecraft propulsion system comprises a reflector array attached to the vehicle. The reflector array comprises a plurality of reflectors spaced apart on a reflective surface, with each reflector acting as an independent focusing mirror. The reflectors are spaced closely together to form a continuous or partially-continuous surface. The reflector array may be formed from a sheet of reflective material, such as copper or aluminum. In operation, a beam of electromagnetic energy, such as a laser beam, is directed at the reflectors which focus the reflected electromagnetic energy at a plurality of regions off the surface. The energy concentrated in the focal region causes a breakdown of the air or other fluid in the focal region, creating a plasma. Electromagnetic energy is absorbed in the plasma and it grows in volume, compressing and heating the adjacent fluid thereby providing thrust. Laser pulses may be applied repetitively. After each such thrust pulse, fresh air can be introduced next to the surface either laterally, or through a perforated surface. If air or some other gas or vapor is supplied, for example from a tank carried on board a vehicle, this invention may also be used to provide thrust in a vacuum environment.

15 Claims, 5 Drawing Sheets

REFLECTOR FOR EFFICIENT COUPLING OF A LASER BEAM TO AIR OR OTHER FLUIDS

The United States Government has rights in this invention pursuant to Contract No. W-7405-ENG-48 between the United States Department of Energy and the University of California for the operation of Lawrence Livermore National Laboratory.

BACKGROUND OF THE INVENTION

1. Field of the Invention

The present invention relates to devices for controlled coupling of laser radiation to matter. More specifically, the present invention provides an apparatus and method for providing thrust using a laser directed to a reflector array. In application, the present invention provides a novel method for propulsion of aircraft and spacecraft. In additional applications, the present invention provides a novel method of diagnosing a beam from a high power laser, and also provides a method for generating a shock wave with a shapeable wavefront.

2. Description of Related Art

Following the launch of the Sputnik satellite several decades ago, a space race ensued in which the United States and the U.S.S.R. raced to be the first to send a man into space. After the U.S. won this race, in the late sixties the U.S. space program achieved remarkable success, landing the first man on the moon. Over the last decade, orbital flights and satellite communication have become almost commonplace. The United States's shuttle has been regularly sending up a crew of several astronauts for scientific experiments and delivery of payloads into orbit. The U.S.S.R. has maintained a space station, in which cosmonauts have resided for many months. The United States plans to build a permanent space station in orbit around the Earth. Furthermore, unmanned satellites have become an important part of the modern technology, providing communication channels for worldwide communication, and taking photographs from orbit for use in weather forecasting and military reconnaissance.

The rockets delivering the satellites and man into space have been, without exception, propelled by conventional chemical rockets which carry their energy stored in the form of the chemicals stored in tanks. The energy is released in an explosive chemical reaction directed to thrust the spacecraft into space. Typically, the rocket is built in several stages, each of which is jettisoned in sequence after its fuel is spent. Each of these stages is typically used only for one launch; therefore the cost of one launch is typically very large. Furthermore, the cost of the ground crew and the complicated systems demand a great deal of attention and testing before a launch, leading to considerable amount of time between launches, stretching into weeks or months.

There is a need for a low-cost launching system for small spacecraft as an alternative to expensive, time-consuming and dangerous chemical launching systems. One particular application for such a launching system is the space station, which will require a large amount of equipment to be sent into orbit, there to be assembled. If the shuttle were the sole launch system, the shuttle would have to make many expensive trips to deliver all the parts for the space station, at a large cost. Another application for low-cost launching system is in the "Brilliant Pebbles" approach to strategic defense currently being pursued at Lawrence Livermore National Laboratory (LLNL). In this approach, a number of small satellites are stationed into space to destroy incoming enemy missiles. The "Brilliant Pebbles" approach would greatly benefit from a low cost, reliable launching system. There is also a need for a low-cost launching system for many other applications including space habitat supply, deep space mission supply, nuclear waste disposal, and manned vehicle launching.

Alternative propulsion methods have been proposed, but so far none have been applied to practical rocket systems. Propulsion of space craft by lasers recently has received serious attention for its potential to provide a low-cost, safe launching alternative to conventional chemical rockets.

In a ground-based laser propulsion system, a large fixed laser supplies energy to propel a spacecraft into space. A laser system has at least two potential advantages: extreme simplicity of on-board engine equipment, and potentially high performance. Because much of the laser engine's thrust energy is provided from the ground-based laser, the spacecraft itself can be made much lighter than conventional rockets; thus saving a large percentage of the spacecraft's thrust for lofting a payload. Furthermore, the spacecraft itself can be manufactured very inexpensively, without the complex mechanical equipment necessary for conventional chemical systems, and re-use is feasible. By far the largest investment in a ground-based laser propulsion system is construction of the laser facilities; however once built, they can be operated for numerous launches at relatively small additional cost. The ground-based laser propulsion may operate alone to provide a sole source of thrust, or it may aid a conventional chemical system.

One proposed laser-based system is a double pulse planar LSD wave thruster. In that system, a first laser pulse ablates a solid (or liquid) propellant. The propellant vaporizes, providing thrust. A second laser pulse is applied to the vaporized material creating a plasma which provides additional thrust. An advantage of that system is that very simple thrusters are possible, possibly just a block of propellant, that have very simple nozzles, or even eliminate them completely. Furthermore, such thrusters produce thrust at an angle to the incident laser beam, and they can be remotely steered by controlling the beam profile. The guidance system may be entirely ground-based, eliminating the need for on-board guidance and control hardware, allowing very cheap disposable vehicles which could be mass produced. Furthermore, because the propellant exhaust velocity is not limited by its chemical energy content, laser propulsion thrusters can provide exhaust velocities several times higher than chemical rockets. However, this type of thruster is inefficient for flight in the Earth's atmosphere, and requires laser pulses of very high energy, which may be difficult to generate and transmit through the atmosphere.

The disadvantages can be overcome by concentrating the laser energy at the vehicle. Several laser-based systems have been proposed that use single reflector to concentrate laser energy, for example, the Apollo Lightcraft. A large cylindrical reflector forms the front of the spacecraft, which concentrates laser energy at a point to form form plasmas in the region surrounding the vehicle. These designs suffer from several disadvantages: they require large precision optics which are difficult to integrate with the vehicle's structure, and they must be precisely aligned with the laser. In other words, the energy conversion efficiency is very sensitive to the beam direction. Furthermore, the thrust direction cannot be controlled remotely by adjusting the laser beam, instead the vehicle must include mechanisms for active steering control.

SUMMARY OF THE INVENTION

The present invention provides a device for controlled coupling of laser radiation to matter. It provides a laser-driven thrust source that may be applied to propel a spacecraft toward space. Such a spacecraft is an alternative to conventional chemical rockets. The launch system can loft a large number of relatively small payloads.

The present invention provides a propulsion system for a vehicle that obtains thrust energy using a laser beam directed from a remotely-based laser source. The propulsion system comprises a reflector array attached to the vehicle. The reflector array comprises a top reflective surface including a plurality of reflectors spaced apart on the reflective surface. The reflectors comprise a material that is reflective to the laser beam, and have a shape to focus reflected laser energy to a focal position off the surface of the reflector. The reflector array comprises an array of concave reflectors spaced closely together to form a continuous or partly-continuous surface. In appearance, the array may seem to be "dimpled". The dimpled surface array may be a sheet of reflective material, such as copper or aluminum, with many small concave pits or dimples formed in it. Each dimple or pit acts as an independent focusing mirror. In operation, a beam of electromagnetic energy, such as a laser beam, is directed at the reflectors, which thus focuses the reflected electromagnetic energy at a plurality of points off the surface. For incident laser fluxes of $10^6$–$10^7$ w/cm$^2$, even a crude reflector can exceed the clean air breakdown threshold of approximately $10^9$ w/cm$^2$.

The small scale of the reflectors allows the reflector array to be responsive to the intensity profile of the laser beam. This feature allows generation of asymmetric thrust, thereby enabling control of the vehicle attitude by adjusting the position of the laser beam on the reflector array.

The electromagnetic energy directed to the reflectors may comprise, for example, a visible laser beam or an infrared laser beam. Depending upon the application, the laser beam may originate at a substantial distance from the reflector array, and is directed to the reflector by any of a number of conventional means. For example, the laser beam may originate at a ground station, and be transmitted from a great distance to the craft. As an advantage, the reflector array is relatively insensitive to the angle of alignment with the incident laser beam; the array will provide substantial thrust even if the radiation is incident on the reflector at a large angle relative to the surface.

When a laser pulse of sufficiently high flux is incident on the reflector array, the energy concentrated in the focal region causes a breakdown of the air or other fluid in the focal region. This breakdown involves the production of large numbers of free electrons in the focal region and the creation of a plasma, which may be defined as "a mass in which neutral atoms or molecules are separated into electrons and electrically-charged ions". Such a plasma can absorb electromagnetic energy and grow in volume. Initially, the plasma grows toward the reflective surface, and as the plasma's area increases, it absorbs additional energy directly from the incident laser beam. Eventually the plasma may block the beam from reaching the reflective surface. This blocking effect causes the plasma to be self-regulating, so that it does not grow large enough to contact the reflector. Thus, the reflectors are physically separated from the hot plasma, preventing damage that would occur if the reflectors were to contact the hot plasma.

During and after the laser pulse, the hot plasma will expand, compressing and heating the adjacent fluid. For example, if the adjacent fluid is air, it will be compressed and exert a substantial force on the reflector surface. If laser pulses are applied repetitively, the compressed air produces repetitive pulses of force which may be used to provide thrust to drive a vehicle. After each such thrust pulse, fresh working fluid can be introduced next to the surface either laterally, or through a perforated surface. If air or some other gas or vapor is supplied, for example from a tank carried on board a vehicle, this invention may also be used to provide thrust in a vacuum environment, as in a rocket. The properties of the reflectors partly determine the volume of gas heated, and the mean temperatures reached, and therefore the gas volume and the mean temperature can be controlled by selecting the reflectors accordingly.

The reflector array may have application as a low-cost launching system, particularly for small spacecraft that does not require huge amounts of thrust. In some embodiments, the reflector array could be applied as a rocket thruster, and in other embodiments, it could be applied to provided an air-breathing propulsion stage for the initial part of a spacecraft's trajectory. The reflector may be used alone as the sole thrust source, or it may be used in conjunction with other types of laser-driven rocket thrusters.

One particular application for such a launching system is the "Brilliant Pebbles" approach to strategic defense currently being pursued at Lawrence Livermore National Laboratory (LLNL). The present invention could be applied to send up many small payloads in a short period of time. A conventional rocket launches a single larger, heavier payload; however, the launches are expensive and spaced widely apart in time; Therefore, launching a number of small payloads can increase the rate at which payloads can be launched into space over time for a given launch system relative to an all-rocket system. Furthermore, the reflector array, when operated as a rocket, may provide higher efficiency in converting laser energy to thrust and/or greater simplicity than alternative laser-driven rockets.

The present invention also has application in other technologies, for example in direct diagnosis of high power laser beams. The small scale of the reflectors provides an response dependent upon the intensity profile of the laser beam. When a high power beam is incident upon the reflector of the present invention, the rate of plasma formation is indicative of the flux of the beam at that location in the cross-section of the beam. The brightness, rate of growth, or other properties of the plasma can be observed and recorded as a function of position using conventional means such as photographic or video cameras. The reflector can thus provide a profile of the intensity of a cross-section of the beam. Such diagnosis has been difficult or impossible because high power is destructive to most photodetectors. Thus, in order to diagnose a high power laser beam using conventional methods, the high power beam was reduced in power, which unfortunately creates additional aberrations that are indistinguishable from the original beam's aberrations.

Further, the present invention has application in creation of shock waves of arbitrary shape. Such an application would be useful in lithotripsy, which is the breakdown of kidney stones within a person's body by focused ultrasonic shock waves. Such converging shock waves could be generated by the present invention. Additionally, many aspects of scientific research may benefit from an ability to customize shock waves to their particular research application.

DETAILED DESCRIPTION OF THE INVENTION

The present invention provides a laser-driven thrust source that can propel a spacecraft toward space. It provides an alternative to conventional chemical rockets, and may be applied to loft a large number of relatively small payloads.

The invention is best understood by reference to the figures wherein like parts are designated with like numerals throughout.

Figure 1:
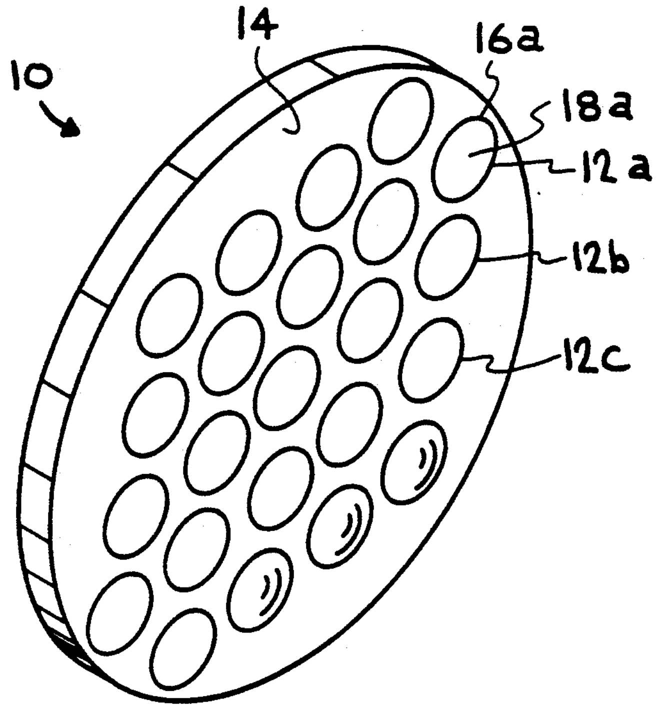
FIG. 1 is a perspective view of a reflector array.

FIG. 1 illustrates a reflector array, shown generally at 10. A number of individual reflectors, such as **12*a*,12*b*,12*c*, are formed on a front surface 14 of the array 10. In the embodiment of FIG. 1, the front surface 14 comprises an approximately planar shape, and the reflectors 12*a*,12*b*,12*c* comprise a concave shape that is approximately spherical; each including a circular outline 16 and a concave depth shape 18. In other embodiments, the front surface 14 may comprise a curve rather than a planar shape, or the outline 16 may be non-circular, or the depth profile 18** may be non-spherical or asymmetrical.

Figure 2:
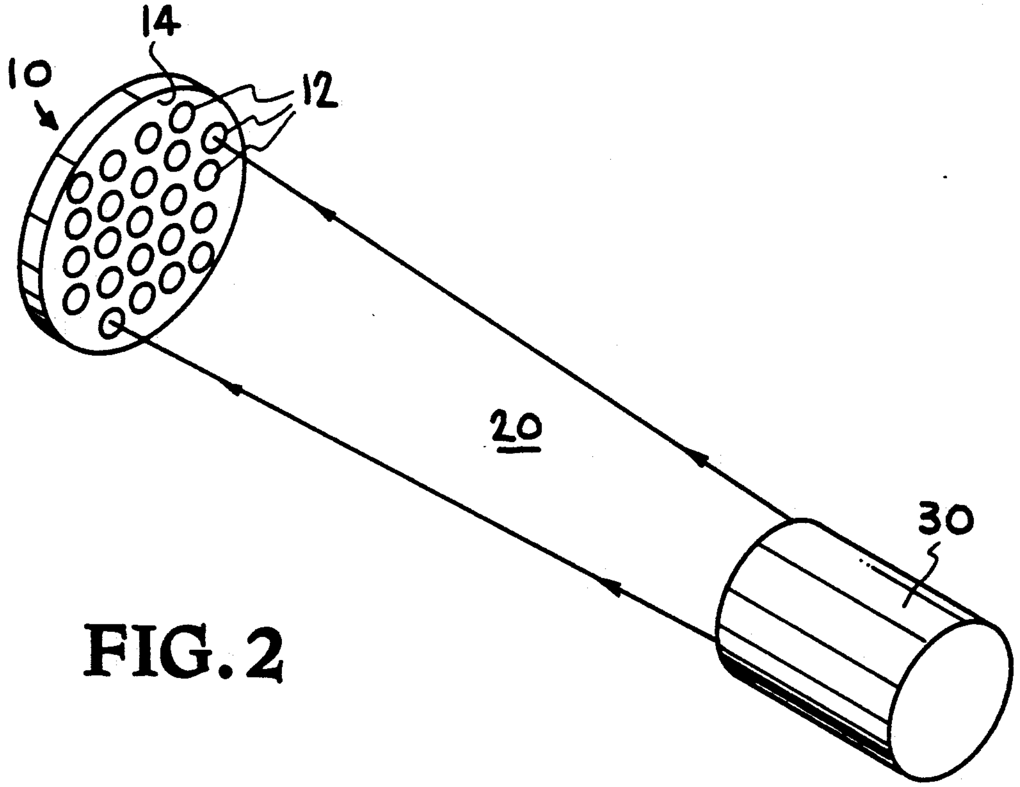
FIG. 2 is a perspective view of a reflector array illuminated by a laser beam.

In the planar array illustrated in FIG. 1, each reflector 12 has a shape that is approximately a portion of a sphere. FIG. 2 illustrates a laser beam 20 incident upon the front reflective surface 14. In the spherical configuration, the reflectors 12 are relatively insensitive to the angle of alignment with the incident laser beam 20; i.e., the array 10 will provide thrust even if the laser beam 20 is incident on the reflector array 10 at a substantial angle relative to the top surface 14. FIG. 3A illustrates some distance relationships within each reflector 12. Each reflector 12 has a diameter 22, and the distance between the centers of adjoining reflectors is a length 24. A focal region 26 is located a distance 28 from each reflector 12.

The reflector array 10 may be advantageously formed from a single slab of reflective material, such as metal. The reflectors 12 may be formed in this slab by molding or conventional machining techniques, with the result that the surface is reflective. It is advantageous that the reflective surface of the reflectors 12 be matched to the frequency of the laser beam 20, so that it has a maximum reflectivity and minimum absorption. In other embodiments, the reflectors 12 may be formed in a slab or sheet of arbitrary material, coated with a highly reflective layer. It is preferable that the reflectors 12 be spaced closely together on the front surface 14 to form array 10 that is covered by the reflectors 12 as completely as possible. For example, the reflectors 12 may be formed on the front surface 14 in overlapping positions, so that the front surface 14 presents no flat surfaces.

FIG. 2 illustrates the laser beam 20 incident upon the reflector array 10. A laser source 30 provides electromagnetic energy in the form of a laser beam 20 that is directed to the reflectors 12. The laser source 30 is not limited to a specific wavelength; any wavelength will be suitable if it can be reflected and focused by the reflectors 12. Examples of such directed electromagnetic radiation include a visible laser beam or an infrared laser beam.

Figure 4:
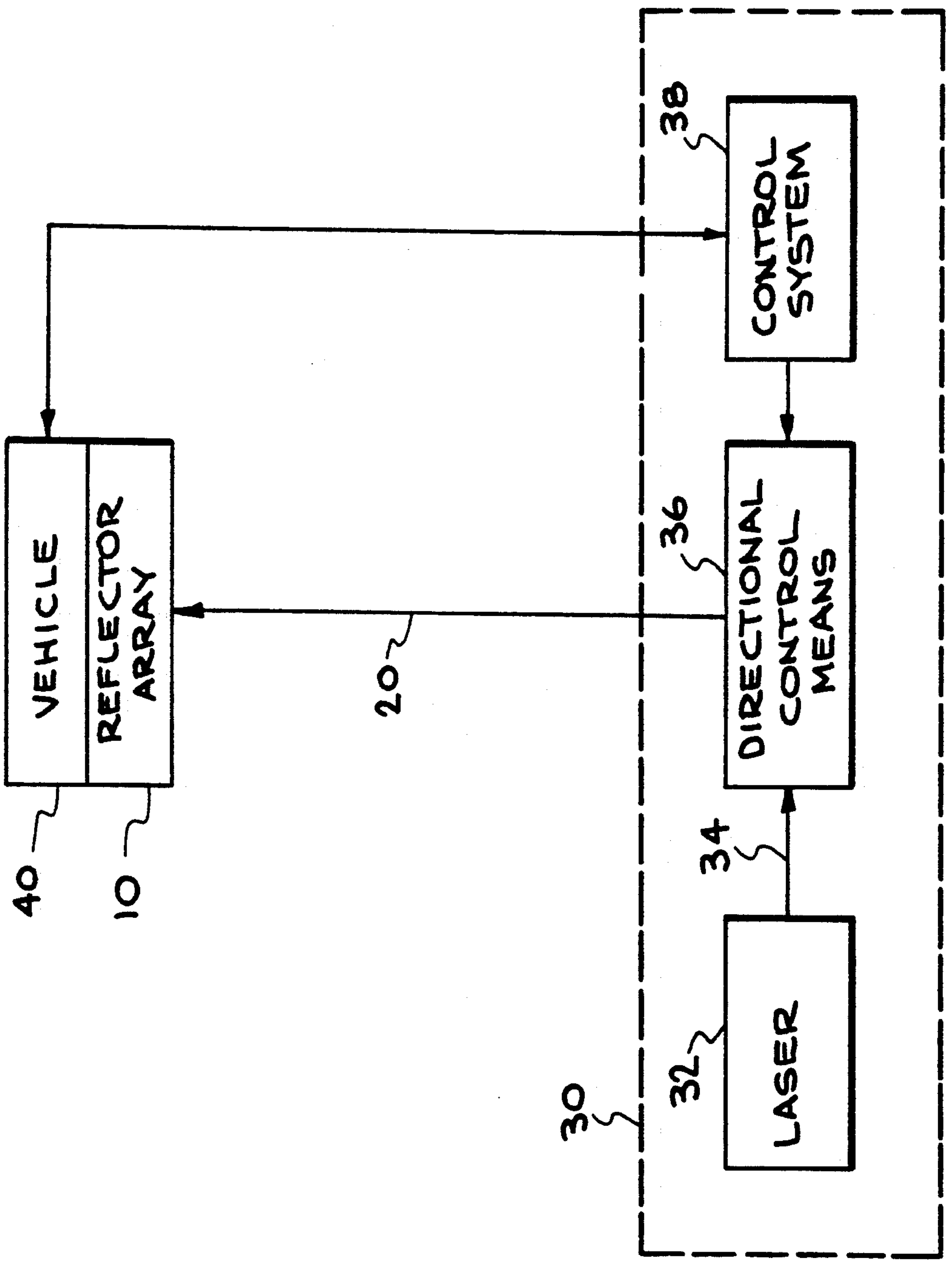
FIG. 4 is a block diagram illustrating the laser source and the system for directing it to the vehicle.

The ground based station, and accurate tracking and pointing of the laser beam is discussed in a U.S. Pat. No. 3,825,211 to Minovitch, which is incorporated by reference herein. FIG. 4 illustrates an embodiment of the laser source 30 in a block diagram. The laser source 30 comprises a laser 32, which provides a laser output 34 to a directional control means 36. The directional control means 36 comprises any of a number of conventional means to direct the laser beam 20 to the reflectors 12, such as a mirror whose position can be remotely controlled. A control system 38 is provided to monitor the position of the laser beam 20 on the reflector 10, which is mounted on a vehicle 40 such as a spacecraft. The control system 38 is connected to the directional control means 36 to adjust its position so that the laser beam 20 is directed toward the reflector array 10. The control system 38 may include conventional telemetry systems or other sensors for remotely monitoring the position and attitude of the vehicle 40. Furthermore, the control system 38 and the vehicle 40 may communicate to exchange commands or information useful to promote a successful launch.

The vehicle 40 may include conventional control systems for adjusting the angular position of the reflector array 10 with respect to the laser beam 20. Using such a control system, it may be possible to control the thrust power and direction imparted to the vehicle 40 by the laser beam 20.

Additionally, the attitude of the vehicle 40 may be controlled from the ground. Specifically, the directional control means 36 can adjust the intensity distribution of the laser beam 20 on the array 10, so as to produce an asymmetrical thrust and thereby apply a torque which rotates the vehicle 40. It is believed that the thrust is produced at a fixed orientation relative to the reflector array 10, and not relative to the incidence angle of the laser beam 20; therefore, the direction of thrust can be controlled by adjusting the attitude of the vehicle 20. As a result, the vehicle 40 may not need an on-board control system.

Depending upon the application, the laser beam 20 may originate at a substantial distance from the reflector array 10. The laser source 30 may be entirely ground-based, and the laser beam 20 may be directed to the vehicle 40 from a distance of hundreds of kilometers. The laser source 30 provides a high average power laser output that is preferably pulsed. The peak flux of the laser beam 20 transmitted through the atmosphere or other medium is preferably maintained below the threshold levels for breakdown on dust, Raman conversion, or other non-linear processes.

The wavelength of a typical laser 32 is very small—on the order of tens of microns or less. The short wavelength and the coherent nature of the laser beam 20 permit the electromagnetic energy in the laser beam 20 to be projected with an extremely small divergence angle, which means that if the laser beam 20 is properly directed to the reflector array 10, the beam 20 will arrive there with little divergence. Thus, within a useful range, a substantial portion of the laser beam 20 can be intercepted by the reflector array 10. The useful range between the laser source 30 and the vehicle 40 depends partly on the diameter of the aperture of the laser source 30 and partly on the laser power dissipation by the atmosphere or by any other fluid through which the beam 20 passes before it arrives at the reflector array 10. With present technology, it is believed possible to build a system including laser source 30 and a reflector array 10 with a useful range of hundreds of kilometers.

Figure 3C:
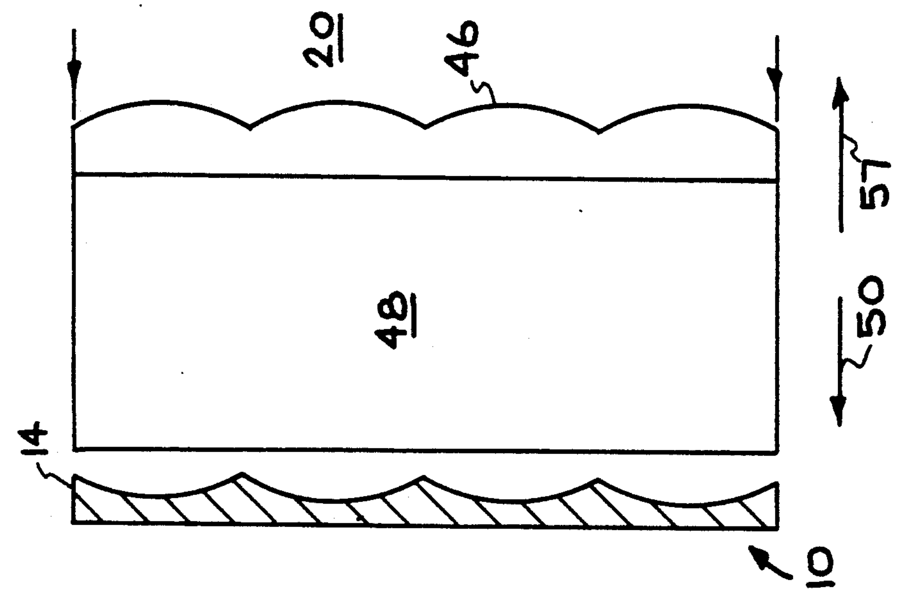
FIGS. 3A, 3B and 3C show a reflector array in cross-section and illustrate the focal regions of the reflector array and formation of a plasma.
Figure 3B:
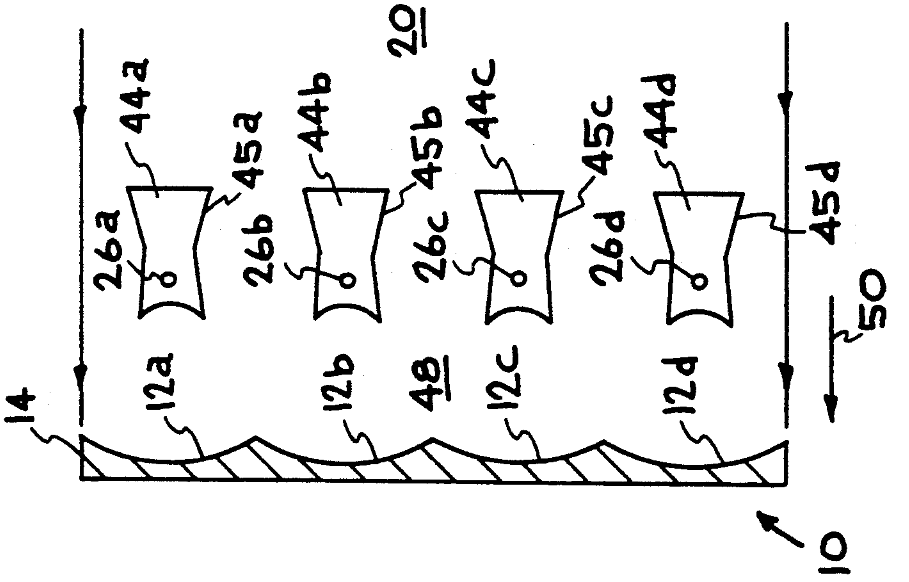
Figure 3A:
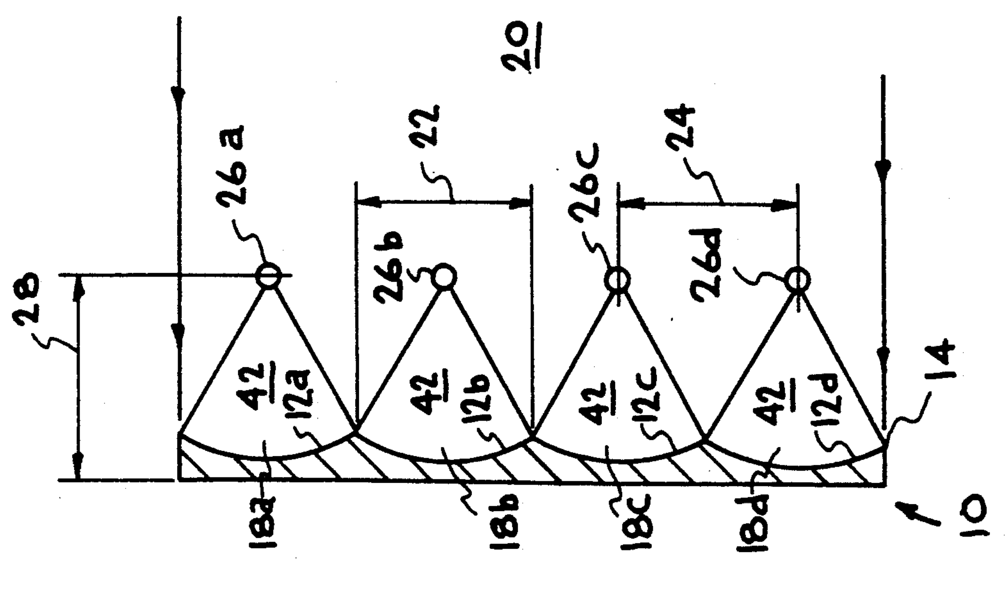

Reference is now made to the sequence of FIGS. 3A,3B,and 3C, to explain the interaction between the reflectors 12, the laser beam 20, and a fluid 42 adjacent to the top surface 14. The fluid 42 may comprise air, for example. When the laser beam 20 has sufficiently high flux, the energy concentrated in the focal region 26 causes a breakdown of the fluid 42 in the focal region 26. This breakdown involves the production of large numbers of free electrons in the focal region 26, thereby creating a plasma 44 from the fluid 42, illustrated in FIG. 3B. A plasma is generally defined as a mass in which neutral atoms or molecules are separated into electrons and electrically-charged ions. The plasma 44 will, over a wide range of conditions, absorb electromagnetic energy and grow in volume. As illustrated in FIG. 3B, the regions of the plasma 44 grow in roughly cylindrical shapes 45, and as the plasma 44 region' area increases, it absorbs additional energy directly from the incident laser beam 20. As energy is coupled directly to the plasma 44, eventually the plasma 44 may grow radially until they merge together to create a plasma layer 46, illustrated in FIG. 3C. The plasma layer 46 substantially absorbs the energy in the laser beam 20, thereby blocking the beam from reaching the reflective array 10. Thus, for sufficiently long pulses, the reflector array 10 may be considered to be an "ignitor", which triggers the formation of a large plasma 44 in the layer 46.

It is advantageous if the focal length 28 and the spacing 24 between the reflectors 12 is selected so that the plasma regions 45 and the plasma layer 46 are physically separated from the top surface 14, and does not damage them. The focal length 28, the diameter 22, and the inter-reflector spacing 24 of the reflectors 12 partly determine the volume of fluid 42 that is heated, and the mean temperature attained, and therefore the volume of the plasma 44 and the mean temperature can be controlled by selecting the dimensions and properties of the reflectors 12 accordingly.

The high average power laser beam 20 may comprise a series of laser pulses each having a very high power. During and after occurrence of an individual laser pulse, the hot plasma 44 will expand, compressing and heating the adjacent fluid 48, illustrated in FIGS. 3B and 3C. The adjacent fluid 48 will be compressed, exerting a substantial force on the reflector surface 14 in the direction illustrated by the arrow 50. If the laser beam 20 comprises a series of repetitive laser pulses, the compressed fluid 48 produces repetitive pulses of force in the direction of the arrow 50 which may be used to provide thrust to drive a vehicle connected to the reflector array 10. This thrust drives the vehicle 40 illustrated in block in FIG. 4, or a spacecraft 51 illustrated in FIG. 8, propelled by a series of plasmas 55. It is also expected that the expansion of the hot plasma 44 into the surrounding fluid 48 will produce a shock wave traveling away from the top surface 14, in the direction of the arrow 57. At distances from the reflector top surface 14 that is large compared to the spacing 24 between reflectors, this shock wave will approximate a shock wave produced by uniform expansion of the fluid 48 adjacent to the reflector surface 14.

Figure 8:
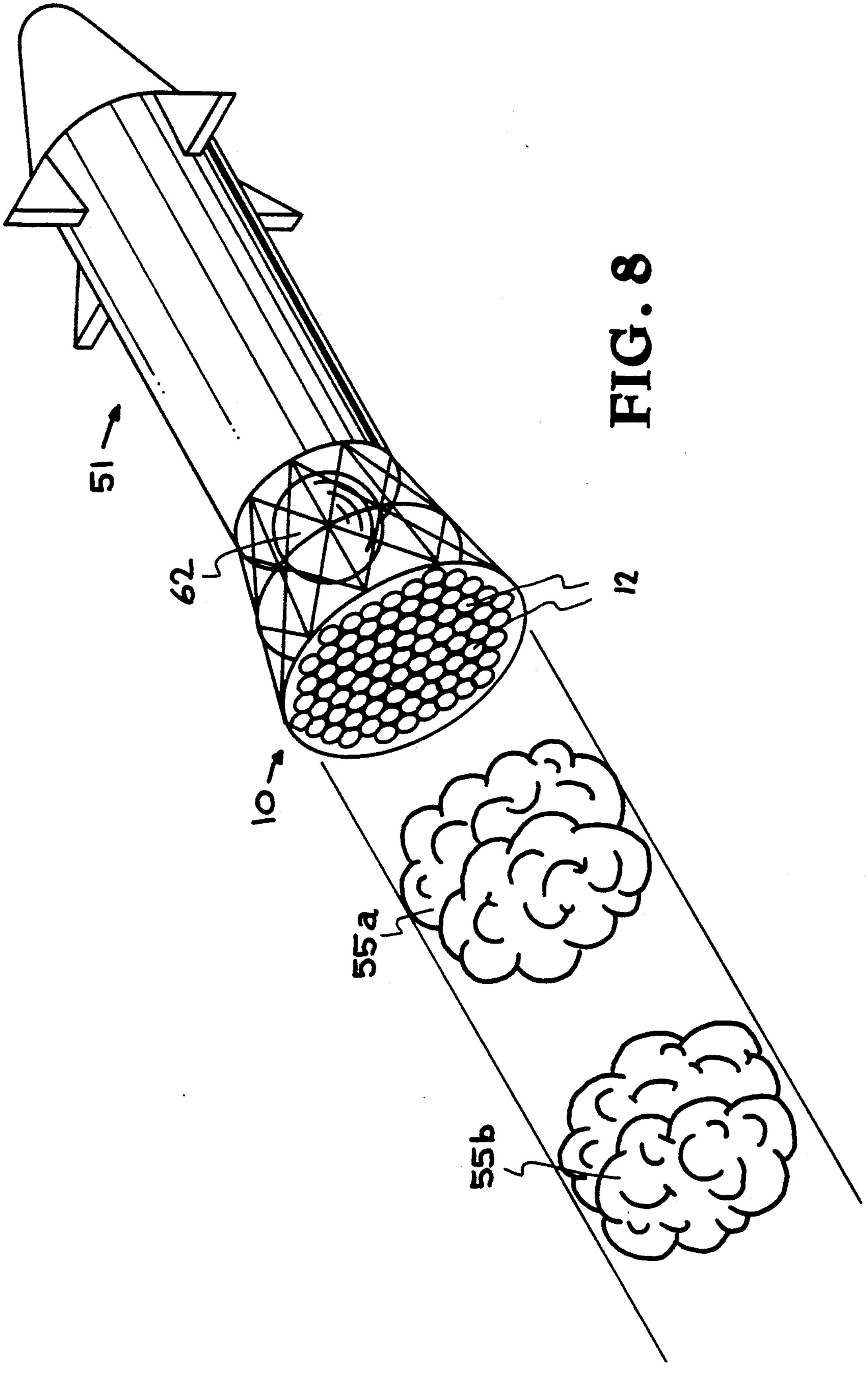
FIG. 8 is a perspective view of a spacecraft being propelled by thrust from the present invention.

With reference to FIG. 8, it will be noted that the size of the reflectors 12 has been made large relative to the ship 51. This distortion is for purpose of illustration only, and does not indicate the actual dimensions of the reflector array 10.

Figure 5:
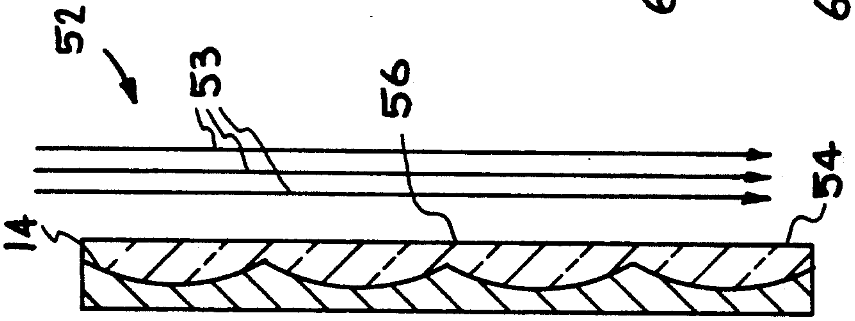
FIG. 5 is a cross-section of an alternative embodiment of the reflector array, including an overcoat.
Figure 6:
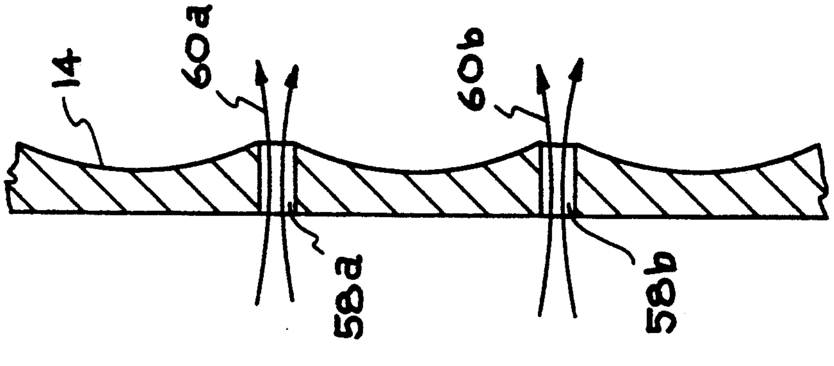
FIG. 6 is a cross-section of another alternative embodiment of the reflector array, including perforations.

After each thrust pulse as illustrated at 55 in FIG. 8, fresh air or some other fluid should be introduced next to the top surface 14. FIGS. 5 and 6 illustrate two different methods by which fresh air can be introduced. FIG. 5 illustrates a lateral flow 52 of a fluid 53 over the surface 14. This lateral flow 52 may be provided by the motion and geometry of the vehicle 40, or by conventional passive means such as a vent, or conventional active means such as a fan (not shown). FIG. 5 illustrates an overcoat 54 that is applied over the top surface 14, the overcoat 54 being substantially transparent to the laser beam 20. The overcoat 54 has a substantially smooth surface 56, for low transverse drag of the lateral flow 52. In other words, the overcoat 54 promotes a lateral flow 52 that is smooth and less turbulent than if the overcoat 54 were not there. As an alternate means of introducing the fluid 53, FIG. 6 illustrates the top surface 14 comprising a series of perforations 58 extending through the reflector array 10. The fluid 53 is provided through the perforations **58*a*,58*b*, in a series of individual flows 60*a*,60*b*. The individual flows 60** may be provided by conventional passive means such as a vent or conventional active means such as a fan (not shown).

The fluid 53 may comprise air, or it may comprise any of a number of gases or liquids that are suitable for plasma creation. If the spacecraft 51 illustrated in FIG. 8 is operating in the atmosphere, it may be desirable to use the ambient air. However, the reflector array 10 may also be used to provide thrust in a vacuum environment. If the vehicle 51 is to be operated outside the atmosphere, or if the fluid 53 comprises a gas or liquid other than air, then the fluid 53 may be provided in an additional tank 62 included in the vehicle 51 carrying the reflector array 10. A conduit or some other conventional means may be used to deliver the fluid 53 to the reflector array 10.

Each of the reflectors 12 in the reflector array 10 are shaped to focus reflected electromagnetic energy from the laser beam 20 into the focal region 26 above each reflector 12. The geometry of the reflectors 12, which has been discussed, includes an outline 16 and a depth profile 18. With reference to FIGS. 1 and 3, the reflectors 12 were described to be spherical. However, the reflectors 12 may formed into any of a variety of reflective configurations; they may comprise any of a variety of outlines 16 and depth profiles 18. For example, the reflectors 12 may have an outline that is circular, or oval, or hexagonal, or cylindrical. The depth profile 18 may be circular or parabolic. The overall shape of the reflector array 10 may be varied to conform to mechanical, aerodynamic, or other requirements, it may, for example, form the outer surface of a cone or sphere, or the inner surface of a hollow cone.

Figure 7:
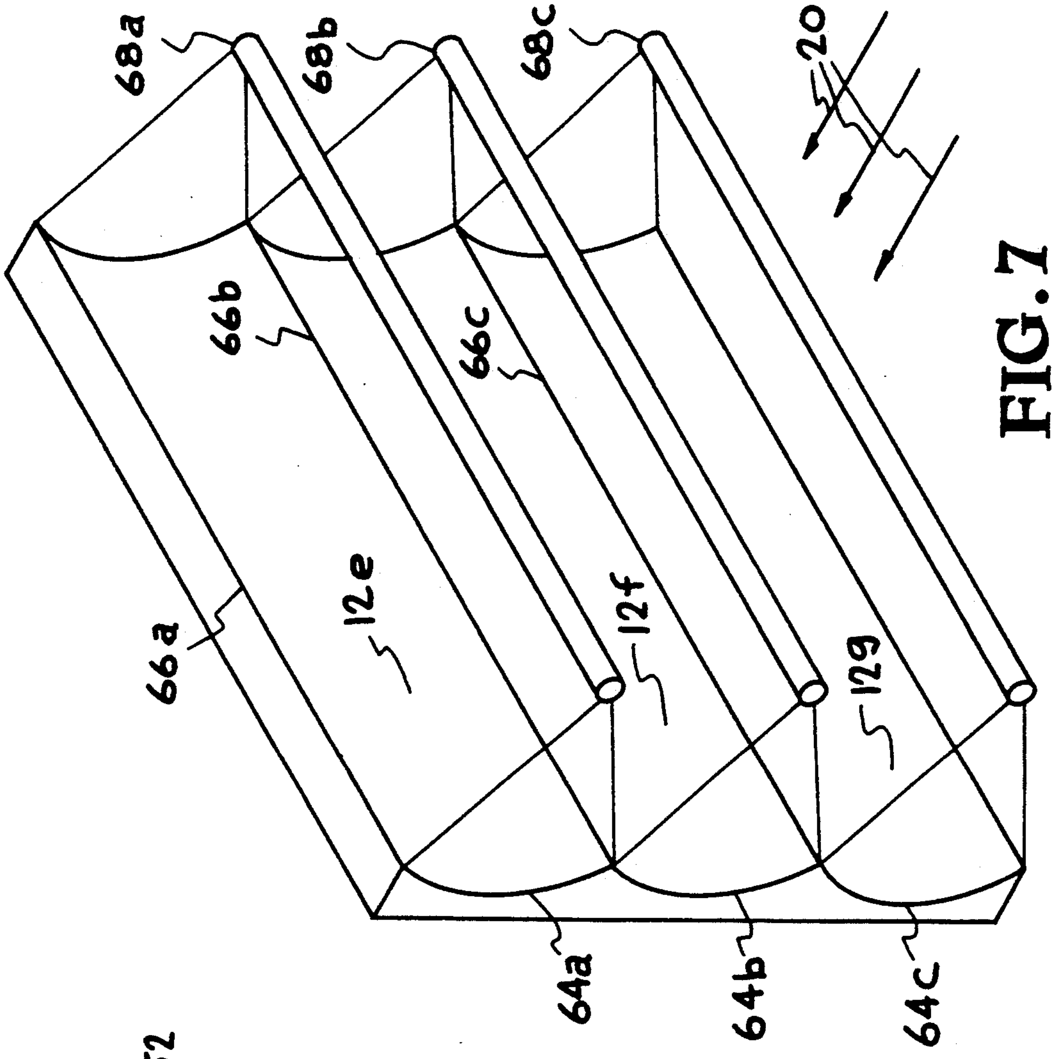
FIG. 7 is a perspective view of another alternative embodiment of the reflector array, wherein the reflectors have a cylindrical shape.

FIG. 7 illustrates one alternative configuration wherein the reflector array 10 comprises a series of parallel cylindrical reflectors **12*e*,12*f*,12*g*. These cylindrical reflectors 12*e*,12*f*,12*g* comprise a concave cross-section 64*a*,64*b*,64*c* along one dimension, and a linear cross-section 66*a*,66*b*,66*c* along the orthogonal dimension. Each reflector 12*e*,12*f*,12*g* focuses the laser beam 20 along a respective line focus 68*a*,68*b*,68*c*. It is believed that the cylindrical reflectors 12*e*,12*f*,12*g* allow substantial variation of the angle of the laser beam 20 with respect to the reflector array 10. However, this configuration may also require a higher incident laser flux and/or higher reflector surface quality to initiate plasma formation at the line focus 68**.

The reflector array 10 may be a component of a low-cost launching system, particularly for small vehicles 40 that do not require huge amounts of thrust. For example, it may be possible to launch 10–1000 kilogram (kg) payloads t orbit using roughly 1 Megawatt (MW) of average laser power per kg of payload. The incremental cost of such launches has been estimated to be $200 per kg for the smallest systems, decreasing to around the cost of electricity to run the laser source 30 (a few times $10 per kg) for a large system. Although the individual payload size would be small, a laser launch system would be inherently high-volume, with the capacity to launch tens of thousands of payloads per year. Also, with high exhaust velocity, a laser launch system could launch payloads to high velocities —geosynchronous transfer, Earth escape, or beyond—at a relatively small premium over launches to low earth orbit.

In some embodiments, the reflector array 10 could be applied as a rocket thruster, and in other embodiments, it could be applied to provide an air-breathing propulsion stage for the initial part of a spacecraft's trajectory. The reflector array 10 may be used alone as the sole thrust source, or it may be used in conjunction with other types of laser-driven rocket thrusters. Used as an air breathing stage the present invention could substantially increase the overall payload capacity (the amount of material that can be launched into space over time) for a given launch system relative to an all-rocket system.

The present invention may be applied to vehicles for a variety of purposes including space habitat supply, deep space mission supply, nuclear waste disposal, and manned vehicle launching.

The present invention also has application in other technologies, for example in direct diagnosis of the intensity profile of high power laser beams. When a high power beam 20 is incident upon the reflector array 10 of the present invention, the rate of formation of the plasma 44 at each focal region 26 is indicative of the flux of the beam 20 at that location in the cross-section of the beam 20. The reflector array 10 can thus provide a profile of the intensity of a cross-section of the beam 20.

Furhter, the present invention has application in creation of shock waves of arbitrary shape. Such a shock wave may be produced in the direction shown by the arrow 50 or the arrow 57 illustrated in FIG. 3C. Such an application would be useful in lithotripsy, which is the breakdown of kidney stones within a person's body focused ultrasonic shock waves. Such converging shock waves could be generated by application of a laser beam 20 to the reflector array 10. In additional applications, the present invention allows creation of controlled shock waves by varying the laser beam 20 in power or cross-section. An ability to create controlled shock waves may be important in scientific research or other endeavors.

The invention may be embodied in other specific forms without departing from its spirit or essential characteristics. The described embodiment is to be considered in all respects only as illustrative and not restrictive and the scope of the invention is, therefore, indicated by the appended claims rather than by the foregoing descriptions. All changes which come within the meaning and range of equivalency of the claims are to be embraced within their scope.

I claim:

1. A propulsion system for providing thrust to a vehicle using a laser beam directed from a remotely-based laser source, said propulsion system comprising:

a reflector array attached to the vehicle, said reflector array comprising a top reflective surface including a plurality of reflectors spaced apart on the reflective surface, said reflectors comprising a material that is reflective to the laser beam, each of said reflectors having a shape to focus reflected laser energy to a separate focal position in front thereof and off the surface of the reflector.

2. The propulsion system as claimed in claim 1, wherein at least one of the reflectors comprises a spherical shape formed so that laser energy which is reflected from the reflector is focused at the focal region.

3. The propulsion system as claimed in claim 1, wherein at least one of the reflectors comprises a cylindrical shape so that the laser energy which is reflected from the reflector is focused along a line at the focal position.

4. The propulsion system as claimed in claim 1, wherein the reflector array comprises an overcoat formed over the top surface, said overcoat having a substantially smooth surface for promoting smooth lateral flow of the fluid over the overcoat.

5. The propulsion system as in claim 1, wherein the reflector array further comprises perforations formed therein to provide flow of a fluid therethrough to the top surface.

6. The propulsion system as claimed in claim 5, further comprising a tank containing a fluid, said tank being connected to the perforations so that the fluid flows from the tank through the perforations.

7. A system for coupling a laser beam to a fluid to produce thrust, said system comprising:

a reflector array comprising a reflective surface including a plurality of reflectors spaced apart on the reflective surface, said reflectors comprising a material that is reflective of the laser beam, each of said reflectors having a shape to focus reflected laser energy to a separate focal position in front thereof and off the surface of the reflector;

a source of laser energy producing a laser beam, said source being spaced from the reflector array; and, means for directing the laser beam to the reflector array.

8. The system as claimed in claim 7, wherein said source of laser energy producing a laser beam produces a laser beam comprising a series of pulses of laser energy.

9. The system as in claim 7, wherein the reflector array further comprises means for introducing a fluid to a top surface.

10. The propulsion system as claimed in claim 9, wherein the spacecraft further comprises a tank containing a fluid, said tank being connected to perforations so that the fluid flows from the tank through the perforations.

11. The system as in claim 9, wherein the means for introducing a fluid to said reflective surface comprises openings in said array communicating with the top surface.

12. The propulsion system as in claim 1, wherein the top reflective surface is substantially continuous and said reflectors closely spaced.

13. The propulsion system as in claim 12, wherein said top reflective surface is substantially planar.

14. The system as in claim 7, wherein a top reflective surface is substantially continuous and said reflectors are closely spaced.

15. The system as in claim 14, wherein the top reflective surface is substantially planar.

* * * * *